United States Patent
Vollmer et al.

(10) Patent No.: US 6,891,800 B1
(45) Date of Patent: May 10, 2005

(54) METHOD OF CONTROLLING DATA FLOW FROM TERMINALS OF A CENTRALLY CONTROLLED COMMUNICATION SYSTEM

(75) Inventors: Vasco Vollmer, Gartow (DE); Markus Radimirsch, Laatzen (DE)

(73) Assignee: Tenovis GmbH & Co. KG, Frankfurt (DE)

( * ) Notice: Subject to any disclaimer, the term of this patent is extended or adjusted under 35 U.S.C. 154(b) by 670 days.

(21) Appl. No.: 09/593,577

(22) Filed: Jun. 14, 2000

(30) Foreign Application Priority Data

Jun. 16, 1999 (DE) .......................... 199 27 544

(51) Int. Cl.⁷ .............................................. G01R 31/08
(52) U.S. Cl. ................................... 370/236; 370/236
(58) Field of Search ............................. 370/229–236, 370/395.21, 400, 401, 410, 412, 465, 468, 337, 338, 347, 395.2, 396, 397, 398, 399, 310.1, 310.2, 395

(56) References Cited

U.S. PATENT DOCUMENTS 5,953,338 A * 9/1999 Ma et al. .............. 370/395.21

FOREIGN PATENT DOCUMENTS

DE 197 26 120 A1 12/1998

OTHER PUBLICATIONS

D. Petras et al: "MAC Protocol with Polling and Fast Collision Resolution . . . ", IEEE ATM Workshop, SA Francisco, CA., Aug. 1996, pp. 908–907.

D. Petras et al: "MAC Protocol for Wireless ATM . . . ", PIMRC 1996, Taipen, Yaiwan, Oct. 1996, pp. 903–906.

* cited by examiner

Primary Examiner—Kenneth Vanderpuye
Assistant Examiner—Robert W. Wilson
(74) Attorney, Agent, or Firm—Michael J. Striker

(57) ABSTRACT

Transmission resource allocation by a central station (ZE) for control of data flow of terminals (T1, T2, . . . ) of a centrally controlled communication system is performed in the terminals (T1, T2, . . . ). A concerned terminal (T1, T2, . . . ) independently decides whether it might only need reduced transmission resource capacity. The decision regarding this reduction in needed transmission capacity is transmitted to the central station, so that it can distribute the unneeded transmission capacity to the remaining terminals.

15 Claims, 3 Drawing Sheets

|  |  | MAC-R 100 | | MAC-R 101 | | MAC-R 102 | | MAC-R 103 | |
|---|---|---|---|---|---|---|---|---|---|
|  |  | RG | RR | RG | RR | RG | RR | RG | RR |
| TERMINAL 1 | SV | 0 | 1 | 1 | 0 | 0 | 1 | 1 | 0 |
|  | NV | 14 | 1020 | 13 | 980 | 28 | 952 | 25 | 927 |
|  | R-BIT | - | 1 | - | 0 | - | 0 | - | 0 |
| TERMINAL 2 | SV | 0 | 1 | 1 | 0 | 0 | 0 | 0 | 0 |
|  | NV | 0 | 0 | 0 | 24 | 3 | 21 | 2 | 19 |
|  | R-BIT | - | 0 | - | 0 | - | 0 | - | 0 |
| TERMINAL 3 | SV | 0 | 0 | 0 | 0 | 0 | 1 | 1 | 0 |
|  | NV | 15 | 35 | 35 | 0 | 0 | 0 | 0 | 0 |
|  | R-BIT | - | 0 | - | 0 | - | 0 | - | 0 |

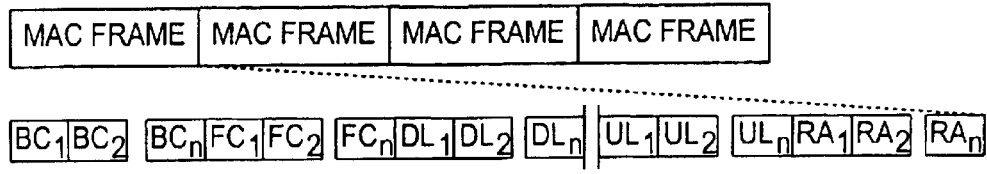
FIG. 4
PRIOR ART
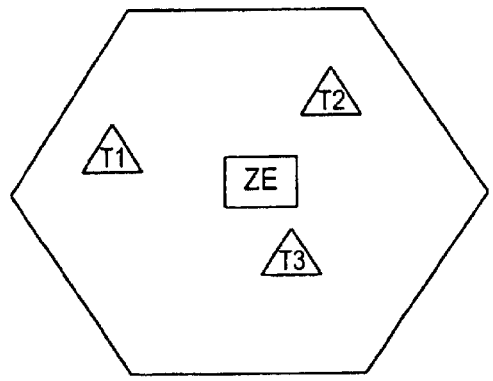
FIG. 5
PRIOR ART
| | | MAC-R1 | | MAC-R2 | | MAC-R3 | | MAC-R4 | |
|---|---|---|---|---|---|---|---|---|---|
| | | RG | RR | RG | RR | RG | RR | RG | RR |
| TERMINAL 1 | SV | 1 | 2 | 2 | 0 | 0 | 1 | 1 | 0 |
| | NV | 36 | 1000 | 33 | 980 | 14 | 1005 | 13 | 1025 |
| | R-BIT | - | 0 | - | 1 | - | 1 | - | 1 |
| TERMINAL 2 | SV | 0 | 1 | 1 | 0 | 0 | 0 | 0 | 0 |
| | NV | 2 | 25 | 2 | 24 | 5 | 20 | 5 | 15 |
| | R-BIT | - | 0 | - | 0 | - | 0 | - | 1 |
| TERMINAL 3 | SV | 0 | 0 | 0 | 0 | 0 | 0 | 0 | 0 |
| | NV | 4 | 100 | 4 | 96 | 12 | 84 | 13 | 71 |
| | R-BIT | - | 0 | - | 0 | - | 0 | - | 0 |
FIG. 6

|  |  | MAC-R 100 | | MAC-R 101 | | MAC-R 102 | | MAC-R 103 | |
|---|---|---|---|---|---|---|---|---|---|
|  |  | RG | RR | RG | RR | RG | RR | RG | RR |
| TERMINAL 1 | SV | 0 | 1 | 1 | 0 | 0 | 1 | 1 | 0 |
|  | NV | 14 | 1020 | 13 | 980 | 28 | 952 | 25 | 927 |
|  | R-BIT | - | 1 | - | 0 | - | 0 | - | 0 |
| TERMINAL 2 | SV | 0 | 1 | 1 | 0 | 0 | 0 | 0 | 0 |
|  | NV | 0 | 0 | 0 | 24 | 3 | 21 | 2 | 19 |
|  | R-BIT | - | 0 | - | 0 | - | 0 | - | 0 |
| TERMINAL 3 | SV | 0 | 0 | 0 | 0 | 0 | 1 | 1 | 0 |
|  | NV | 15 | 35 | 35 | 0 | 0 | 0 | 0 | 0 |
|  | R-BIT | - | 0 | - | 0 | - | 0 | - | 0 |

METHOD OF CONTROLLING DATA FLOW FROM TERMINALS OF A CENTRALLY CONTROLLED COMMUNICATION SYSTEM

BACKGROUND OF THE INVENTION

1. Field of the Invention

The present invention relates to a method of controlling data flow from terminals in a centrally controlled communication system.

2. Prior Art

Several terminals T1 ... T8, for example radio telephone units, PCs or other radio- or line-connected terminals are coordinated by a main station or central station. They can communicate, for example, by radio transmissions. It is also possible that the terminals directly communicate with each other but are coordinated by the central or main station ZE (FIG. 1). The terminals inform the central station of the state of their buffers, especially of the filling degree of the transmitting and receiving buffers. The central station ZE assigns the resources to the terminals. Methods for allocating transmission capacity in this kind of communication network are disclosed in German Patent Application 197 26 120.5; also in D. Petras, A. Krämling, "MAC protocol with polling and fast collision resolution for an ATM air interface", IEEE ATM Workshop, San Francisco, Calif., August 1996; and in D. Petras, A. Krämling, A. Hettich, "MAC protocol for Wireless ATM: contention free versus contention based transmission of reservation requests", PIMRC' 96, Taipei, Taiwan, October 1996. Usually a MAC channel access protocol (Medium Access Control) is used.

In order to request resources a terminal sends out a so-called resource request (RR), in which it informs the central station ZE of its needs. The RR message applies for an individual DLC (Data Link Control) connection and contains the number of messages that wait in the buffer of the terminal for transmission. It is important that the number of waiting messages in the buffer can exceed the capacity of an individual MAC transmission frame. The central station ZE confers the capacities of the individual phases of a MAC transmission frame again on the basis of individual DLC connections. For the down-link phase (central station in control of the terminal) it informs the terminal that is to receive the message. For an up-link phase (terminal in control of the central station) it informs which terminal may request a DLC connection at a predetermine time. For the direct mode channel (direct communication of the terminals with each other) the transmitter and receiver and the DLC connection are announced.

It should be noted that the RR message should always give the actual filling state of the buffer. In order to receive capacity according to the filling state as allocated by the central station ZE, it is not advisable for a terminal to transmit less than its actual filing state to the central station ZE, since the priority or urgency of the transmission is evaluated incorrectly by the central station under the circumstances.

Data flow control mechanisms already exist which operate so that a terminal can inform the central station ZE or the central station ZE can inform the terminal, that it would like to receive nothing for a predetermined DLC connection. This happens in connection with an ARQ (automatic repeat request) protocol and can prevent receiving buffer overflow.

SUMMARY OF THE INVENTION

It is an object of the present invention to provide a method of controlling terminals in a centrally controlled communication system of the above-described kind which is simpler and accounts for available buffer capacity, so that buffer overflow can be avoided.

According to the invention the method for controlling data flow of terminals in a centrally controlled communication system comprises allocating transmission resources to the terminals of the communication system by a central station according to the following method steps:

a) a terminal decides that it would like to use only a reduced transmission resource capacity at least in a transmission from it, independently of the assigned resources; and b) the decision regarding the reduction of transmission resource capacity is transmitted from the terminal making the decision to the central station so that the central station can allocate the unused transmission capacity, as needed, to other terminals.

The method of the claimed invention can control the flow of a transmission from a terminal in a simple manner. Advantageous embodiments of the invention are set forth in the dependent claims.

The invention is based on the following understanding:

When a terminal has a well-filled transmission buffer for a certain DLC connection and informs the central station of its filling state, the resource allocation does not occur according to rank, when, e.g., other terminals have little to transmit. The terminal might not have as much transmission capacity during up-link than it could receive based on the filling state of its buffer and the actual load situation for various reasons. The central station ZE would not otherwise know this and allocates more transmission capacity to the terminal since it needs it. For the case of receiving data it is possible to use the so-called ARQ protocol for flow control.

During a ranked allocation of transmission resource capacity the transmitting/receiving units of a terminal can overheat and can be destroyed or at least do not operate correctly. This can occur especially when the transmitting/receiver unit is in the form of a PC card in a laptop, where it is is heated under the circumstances by heat generated inside the housing. In this case it is useful to reduce the activity of the transmitting/receiving unit for a predetermined time without entirely losing its operability. An additional situation where a transmission flow control according to the invention can be useful is a situation in which it is desirable or necessary to save current. It would be useful to reduce the current consumption of a terminal whose battery power is slowly dropping.

Without flow control mechanisms in the transmission direction a situation can occur in which a terminal is allocated capacity in an up-link or direct-mode phase, which it cannot or will not use because of the previously described reasons. In this case this allocated capacity remains unused, although it could be given to other terminals which could have used it.

It would be possible to reduce the number of data packets in the RR message. This generally would result in the DLC connection of one terminal not being weighted according to its weight, which gives the total number of messages present in the transmission buffer, relative to the other terminals. This leads to incorrect resource distribution. An additional possiblity would be that a terminal transmits an inscription in a central station ZE (association), so that it basically receives or transmits a certain percentage of the MAC frame. This has the disadvantage that the terminal does not transmit it when it could easily use the entire MAC frame or at least a large part of it. This occurs then when the transmission/reception unit was not active for a long time and can cool sufficiently, or when the terminal is suspended from the network or the battery is completely filled.

BRIEF DESCRIPTION OF THE DRAWING

The objects, features and advantages of the invention will now be illustrated in more detail with the aid of the following description of the preferred embodiments, with reference to the accompanying figures in which:

FIG. 4 is a diagram illustrating a MAC frame for a sectorized antenna;

FIG. 5 is a diagram illustrating a radio cell in a radio communication system with a central station and three terminals;

FIG. 6 is a diagram illustrating a sequence of four MAC frames with R-bits set in accordance with the method of the invention;

DESCRIPTION OF THE PREFERRED EMBODIMENTS

For improved understanding of the present invention prior to describing the present invention in detail the structure of a transmission frame, especially according to the MAC channel access protocol, is described in detail.

Figure 1:
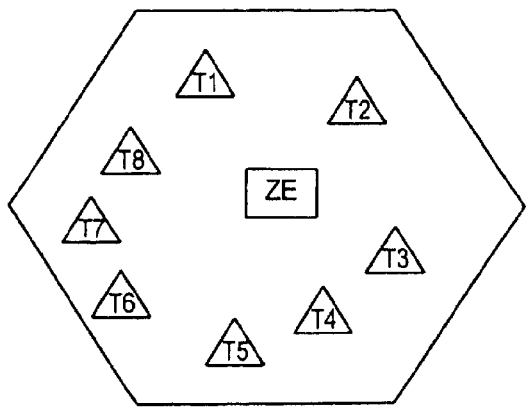
FIG. 1 is a simplified diagram of a known communication system including a central station and a number of terminals.
Figure 2:
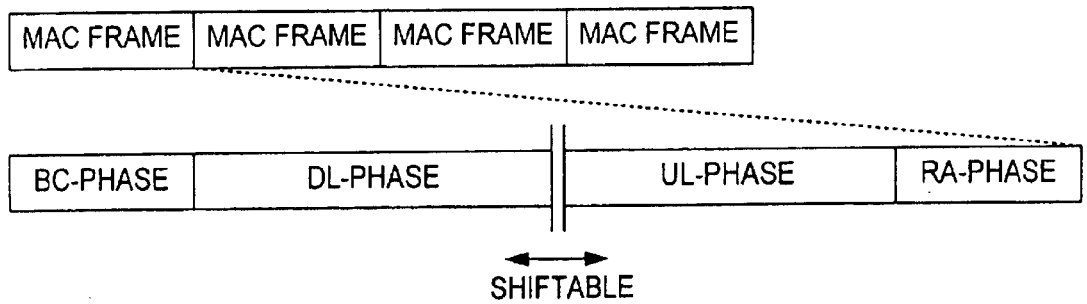
FIG. 2 is a diagram illustrating a MAC frame and its contents.

Transmissions occur in individual MAC frames of fixed duration according to FIG. 2. Each MAC frame is divided into a broadcast phase BC, a down-link phase DL, an up-link phase UL and a random access phase RA. During the broadcast phase BC the central station ZE transmits information, which is relevant for all terminals T1, T2, . . . , e.g. name and address of the central station ZE, information regarding transmission in the down-link and up-link phases and the position of the random access phase. In the down-link phase the central station ZE transmits data to individual terminals, in the up-link phase individual terminals transmit data to the central station. In the random access phase RA terminals that have been allocated no transmission capacity in the up-link phase transmit information to the central station ZE. In that stage they can freely select so that no collisions occur.

Figure 3:
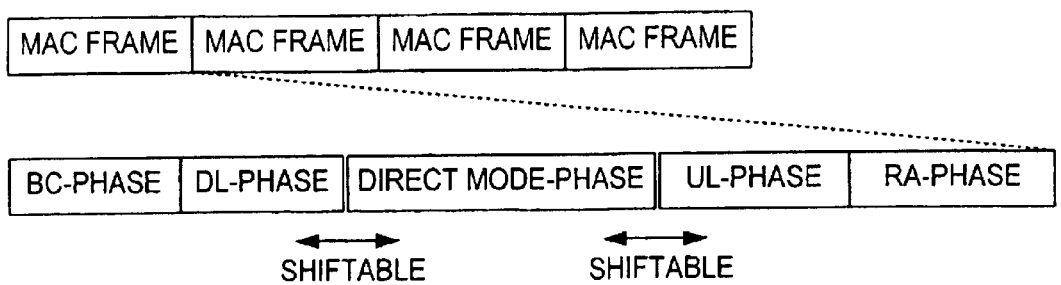
FIG. 3 is a diagram illustrating a MAC frame with a direct-mode-phase.

FIG. 3 shows the inclusion of an additional phase in the MAC frame, which allows direct communication of the terminals with each other. This phase is called the direction-mode phase. The resulting format of the MAC frame is shown in FIG. 3. The exact sequence of the phases is not relevant.

When sectorized antennas are used for broadcasting exactly one broadcast phase is employed per MAC frame and no or one other phase is prepared for each sector. This is shown in FIG. 4. The indices concern the sectors FC, i.e. $FC_1$ relates to sector 1, $FC_2$ relates to sector 2. The broadcast phase BC is divided into two phases, the BC phase and the FC phase, which occur at separate time intervals in the MAC frame.

The process according to the invention essentially comprises letting a terminal T1, T2, . . . itself decide that it would like to use only a reduced transmission resource capacity at least in transmission and communicate this decision to the central station ZE, so that it can allocate the unused capacity, as needed, to other terminals. For this purpose information, especially a bit, is inserted in the RR message, with whose help the central station ZE can be informed that the terminal would like to transmit only a part of a MAC frame. This bit is called a reduction bit (R-bit) in the following description of the invention. When this R-bit is not set, the central station ZE allocates an arbitrary number of MAC frames to the terminal for transmission. If the R-bit is set, the central station ZE assigns only a part of the MAC frame to the terminal.

According to the invention the amount of the reduction relates to the duration of the MAC frame. In order to obtain considerable reduction when the R-bit is set, preferably the central station ZE allocates a maximum of 20% of the MAC frame to the terminal for transmission. This amount relates to the duration of the MAC frame. It does not necessarily depend on the data rate or other variables (the same is true above all for link adaptation). The reduction relates to the sum of the transmission time in up-link and to the direct-mode phase and relates to a terminal, independent of the number of existing DLC links.

The claimed methods for flow control may be used especially only for the transmitting portion of the terminal. The flow control provided in the known ARQ mechanism can be used for control in relation to the reception of data packets.

The terminal can set the R-bit at any arbitrary time and according to its own decision. Since the use of the R-bit relates to the terminal, the terminal should set the R-bit in all RR messages for all active links. When the link requires a certain quality of service, the R-bit should only be set if the message traffic compatibility allows it. A terminal, which must take the possibility of overheating into account, should not make any link or connection that requires a fixed data rate, for which more than 20% of the MAC frame must be used.

When the central station ZE finds that the R-bit is set in a RR message from a terminal, it should reduce the transmission allocation in the terminal to a maximum of 20% for subsequent MAC frames, which are allowed considering the processing time. When the R-bit is set in a MAC frame in no RR message of the terminal during this phase, the central station ZE will terminate the reduction of the data rate to 20% in the subsequent MAC frames, in which that is allowed considering the processing time.

An embodiment of a radio cell in a communication system is shown in FIG. 5 that includes a central station ZE in the center and three terminals T1, T2 and T3. It should be noted that each MAC frame, which the central station generates, contains the capacity for 70 respective messages, which can be arbitrarily distributed during the up-link and down-link phase (see FIG. 2).

Each terminal has two open DLC-links, a link for control signaling and an additional link for useful data. The terminal T1 is designed so that sometimes heating problems occur, during which the terminals T2 and T3 do not have heating problems.

Figures 7, 8:
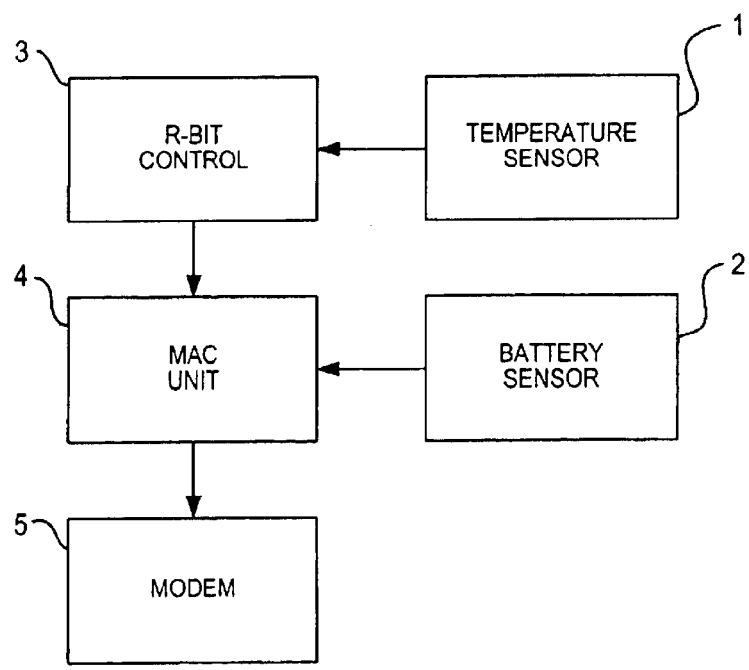
FIG. 7 is a diagram illustrating a sequence of four MAC frames with R-bits not set in accordance with the method of the invention.
FIG. 8 is an arrangement for performing R-bit control in one embodiment of the method according to the invention.

For example, procedures are shown in FIGS. 6 and 7. The control connection or link is designated with SV, the useful link with NV, the resource requirements with RR (resource request), the resources allocated with RG (resource granted)

and MAC frames with MAC-R. The RGs relate only to the transmission possibilities in up-link. The remaining part of the transmission possibilities for the central station ZE in down-link are not shown so that the entire 70 possible message packets do not appear in these figures.

Control links are preferably handled fundamentally on the basis of their urgency. Otherwise the useful links of the different terminals are equally authorized. The number of allocated transmission possibilities in up-link thus only depends on the number of message packets in the transmission buffer.

Terminal 1 has a very full transmission buffer in this example and thus is allocated the main share of the transmission possibilities in frames 1 and 2. Terminals T2 and T3 have a comparatively lower filling level and thus receive fewer transmission possibilities.

An overheating occurs in terminal T1 in MAC frame 2, so that it sets the R-bit. In subsequent MAC frames however the central station ZE assigns the terminal T1 the allowed 20% of the time, also 14 transmission possibilities. Since new permanent message packets arrive in the transmission buffer of terminal T1, the level in the buffer increases. The terminal in this case must itself limit the message input when the buffer is threatened with overflow. An internal mechanism of a known kind can be used, which however is not relevant here.

The terminals T2 and T3 are allocated a comparatively small number of transmission possibilities. The number rises in the third MAC frame, in which the terminal T1 is allocated less capacity because the R-bit is set.

This situation lasts until the MAC frame 101, see FIG. 7. The overheating at terminal T1 has then cooled to the extent that it can again be filled. It cancels the R-bit, so that an increased allocation of transmission possibilities is obtained for it in the following MAC frame 102. Because of the higher number of message packets in terminal T1 in MAC frame 102 terminal T2, which would like to send a set of message packets, is allocated only a comparatively reduced number of transmission possibilities.

A possible arrangement for performing the method according to the invention is set forth in the following description.

As previously mentioned, the setting of the R-bit can be triggered by overheating. Furthermore it is also possible that the R-bit can be set when a battery discharges. FIG. 8 shows the required operating devices for this purpose and their connections.

The R-bit controller 3 is connected with a temperature sensing device 1 and a battery sensor 2. When one of both sensors transmits a signal to the R-bit controller 3, these transmit information to the MAC unit 4 and/or to the modem 5. The R-bit controller 3 then sets the R-bit in the subsequent resource requirements.

The reduction process was described up to now for an individual bit. It is also of course possible to use several bits for this purpose. If e.g. 2 bits are used, different coding possibilities permit all together four. Each coding possibility stands for a reduction of the transmission rate of a terminal to a predetermined percentage of the duration of a MAC frame. For example, the following coding of the bits is possible: 00—no reduction; 01—reduction to 75%; 10—reduction to 50%, 11—reduction to 25%.

The method for transmission flow control was described for a communication system, in which the resource requirements and resource allocation occurs on the basis of DLC links. However it is also possible to build a system so that the resource requirements and their allocation occurs on another basis. Those other possibilities are listed hereinbelow and include:

resource requirements defined on the basis of certain properties of the DLC links, e.g. on the basis of traffic classes, service quality classes or properties for an entire terminal, and resource allocation on the basis of traffic classes, service quality classes or per terminal.

The process according to the invention can also be used in the following cases.

In the description so far the reduction of the data rate of a terminal was controlled in the transmission case by the R-bit and in the reception case by the ARQ flow control protocol. However it is also possible that both the transmission and the reception flow are controlled by the described reduction of the transmission resource capacity.

The examples described previously relate to system in which a constant number of packets are transmitted per MAC frame. The system also has sufficient accuracy so that it is useable for cases in which the number of packets per MAC frame is variable. A reason for that can be flexible modulation and channel coding methods, which can change from MAC frame to MAC frame and can be defined individually for each terminal.

In the previously described method the setting of the R-bit or the R-bits occurs for the entire terminal. Since the R-bits, or the R-bit, are transmitted in resource requirements for a DLC link or connection, it is also likewise possible to limit the reduction to a single DLC link instead of the entire terminal.

In the example described here the R-bit when activated is equal to 1. However it is also possible that it is 0 when activated.

As previously described the MAC protocol for sectorized antennas and/or a direct-mode phase can be used. The method according to the invention is also suitable for this purpose.

Up to now the portion of the MAC frame, which may be used with the R-bit set, is established. It is however also possible to treat this percentage between the central station and the terminal at any time point and even to set it anew during operation.

The disclosure in German Patent Application 199 27 544.0 of Jun. 16, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of controlling data flow from terminals of a centrally controlled communication system, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method for controlling data flow of terminals in a centrally controlled communication system including a central station (ZE) for controlling the communication system, said method comprising allocating transmission resources to the terminals (T1, T2, . . . ) of the communication system by the central station (ZE) according to the following steps:
   a) a terminal (T1, T2, . . . ) requiring the transmission resources makes a decision whether or not to use only reduced transmission resource capacity at least in transmission therefrom, independently of available transmission resources;
   b) the decision rewarding the reduced transmission resource capacity is transmitted from the terminal making the decision to the central station (ZE) so that the central station (ZE) allocates any remaining unused transmission resource capacity, as needed, to other terminals of the communication system; and inserting information entities in a transmission frame of a resource requirement message (RR) of said terminal (T1, T2, . . . ) to the central station, wherein said resource requirement message informs the central station about a required or intended capacity, and wherein said information entities signal a reduced amount of transmission possibilities during at least one of an up-link phase and a direct-mode phase.

2. The method as defined in claim 1, further comprising assigning respective transmission resource capacities to said terminals (T1, T2, . . . ) based on filling states of corresponding transmission buffers of said terminals by means of the central station (ZE).

3. The method as defined in claim 1, further comprising selecting a predetermined amount of reduction of the available transmission resource capacity independently of at least one of a date rate and a number of active links and in relation to a duration of a transmission frame.

4. The method as defined in claim 3, wherein the selecting of the predetermined amount of reduction takes place according to a medium access control channel access protocol.

5. The method as defined in claim 3, wherein the selecting of the predetermined amount of the reduction takes place according to a sum of transmission times during at least one of the up-link phase and during direct-mode phase.

6. The method as defined in claim 1, wherein the information entities that signal the reduced amount of transmission possibilities comprise a reduction bit (R-bit) for setting the reduced transmission resource capacity for said terminal.

7. The method as defined in claim 6, further comprising controlling the setting of the reduced transmission resource capacity in said terminal by means of at least one sensor (1, 2).

8. The method as defined in claim 6, further comprising controlling the setting of the reduced transmission resource capacity in said terminal (T1, T2 . . . ) by means of at least one of a temperature sensor (1) and a battery sensor (2).

9. The method as defined in claim 1, wherein the information entities that signal the reduced amount of the transmission possibilities comprise a plurality of reduction bits (R-bits) for setting the reduced transmission resource capacity for said terminal (T1, T2, . . . ), and further comprising providing a code for different reducing factors with said plurality of said reduction bits (R-bits) according to a duration of the transmission frame.

10. The method as defined in claim 1, wherein resource allocation and resource requirements occurs based on individual DLC links or according to predetermined properties of said individual DLC links.

11. The method as defined in claim 1, further comprising controlling transmission flow and reception flow based on said decision to receive said reduced transmission resource capacity.

12. The method as defined in claim 1, wherein said reduced transmission resource capacity and a reduction factor for said reduced transmission resource capacity are adjustable independently of said decision and transmission of said decision to said central station.

13. The method as defined in claim 12, wherein said reduction factor and said reduced transmission resource capacity are adjustable during operation.

14. A method for controlling data flow of terminals in a centrally controlled communication system including a central station (ZE) for controlling the communication system, said method comprising allocating transmission resources to the terminals (T1, T2, . . . ) of the communication system by the central station (ZE) according to the following steps:
   a) a terminal (T1, T2, . . . ) requiring the transmission resources makes a decision whether or not to use only reduced transmission resource capacity at least in transmission therefrom, independently of available transmission resources; and
   b) the decision regarding the reduced transmission resource capacity is transmitted from the terminal making the decision to the central station (ZE) so that the central station (ZE) allocates any remaining unused transmission resource capacity, as needed, to other terminals of the communication system; and controlling reception flow according to an automatic repeat request protocol.

15. A method for controlling data flow of terminals in a centrally controlled communication system including a central station (ZE) for controlling the communication system, said method comprising allocating transmission resources to the terminals (T1, T2, . . . ) of the communication system by the central station (ZE) according to the following steps:
   a) a terminal (T1, T2, . . . ) requiring the transmission resources makes a decision whether or not to use only reduced transmission resource capacity at least in transmission therefrom, independently of available transmission resources;
   b) the decision regarding the reduced transmission resource capacity is transmitted from the terminal making the decision to the central station (ZE) so that the central station (ZE) allocates any remaining unused transmission resource capacity, as needed, to other terminals of the communication system; and
   c) controlling reception flow according to an automatic repeat requested protocol.

* * * * *